US012677738B2

(12) United States Patent
Williams et al.

(10) Patent No.: US 12,677,738 B2
(45) Date of Patent: Jul. 14, 2026

(54) LAWN MOWER

(71) Applicant: TECHTRONIC CORDLESS GP, Anderson, SC (US)

(72) Inventors: Ryan Williams, Anderson, SC (US); Ryan Kropfelder, Greenville, SC (US); James Rollins, Lexington, KY (US)

(73) Assignee: TECHTRONIC CORDLESS GP, Anderson, SC (US)

( * ) Notice: Subject to any disclaimer, the term of this patent is extended or adjusted under 35 U.S.C. 154(b) by 944 days.

(21) Appl. No.: 17/898,560

(22) Filed: Aug. 30, 2022

(65) Prior Publication Data

US 2023/0065779 A1     Mar. 2, 2023

Related U.S. Application Data

(60) Provisional application No. 63/238,572, filed on Aug. 30, 2021.

(51) Int. Cl.
A01D 34/68          (2006.01)
A01D 34/69          (2006.01)
(Continued)

(52) U.S. Cl.
CPC ............. A01D 34/69 (2013.01); A01D 69/02 (2013.01); A01D 69/08 (2013.01);
(Continued)

(58) Field of Classification Search
CPC ...... A01D 34/69; A01D 34/78; A01D 34/824; A01D 34/6806; A01D 69/02; A01D 69/08;
(Continued)

(56) References Cited

U.S. PATENT DOCUMENTS 2,786,694 A     3/1957   Gray
2,957,295 A     10/1960   Brown
(Continued)

FOREIGN PATENT DOCUMENTS

CN          2381113 Y     6/2000
CN          201518585 U     7/2010
(Continued)

OTHER PUBLICATIONS

European Search Report Corresponding with Application No. EP22191391 on Jan. 12, 2023 (2 pages).
(Continued)

*Primary Examiner* — Joseph M Rocca
*Assistant Examiner* — Robert E Pezzuto
(74) *Attorney, Agent, or Firm* — Dority & Manning, P.A.

(57)          ABSTRACT

Lawn mowers are provided. A lawn mower includes: a mower deck; a cutting implement disposed below the mower deck; a handle coupled to the mower deck; a battery receiver configured to receive one or more batteries; a rear drive wheel; a forward drive wheel; a rear transmission coupled to the rear drive wheel and configured to receive power from the one or more batteries; a forward transmission coupled to the forward drive wheel and configured to receive power from the one or more batteries; and a controller configured to control at least one of the rear or forward transmissions.

19 Claims, 3 Drawing Sheets

(51) Int. Cl.

| | | |
|---|---|---|
| *A01D 34/74* | (2006.01) |
| *A01D 34/82* | (2006.01) |
| *A01D 69/02* | (2006.01) |
| *A01D 69/08* | (2006.01) |
| A01D 34/78 | (2006.01) |
| A01D 101/00 | (2006.01) |
| B60K 17/02 | (2006.01) |
| B60K 17/354 | (2006.01) |
| B60K 17/356 | (2006.01) |
| B60L 53/80 | (2019.01) |

(52) U.S. Cl.
CPC ...... *A01D 2034/6843* (2013.01); *A01D 34/78* (2013.01); *A01D 34/824* (2013.01); *A01D 2101/00* (2013.01); *B60K 17/02* (2013.01); *B60K 17/354* (2013.01); *B60K 17/356* (2013.01); *B60L 53/80* (2019.02); *B60L 2200/40* (2013.01)

(58) Field of Classification Search
CPC ....... B60L 53/80; B60K 17/02; B60K 17/354; B60K 17/356
See application file for complete search history.

(56) References Cited

U.S. PATENT DOCUMENTS

| | | | |
|---|---|---|---|
| 2,966,365 A | 12/1960 | Kortum |
| 3,145,519 A | 8/1964 | Pearson |
| 3,481,123 A | 12/1969 | Lessig |
| 3,593,505 A | 7/1971 | Mittelstadt |
| 3,618,304 A | 11/1971 | Eckhard |
| 3,694,855 A | 10/1972 | Meyer |
| 4,361,001 A | 11/1982 | Almond |
| 4,706,446 A | 11/1987 | Doi |
| 4,916,887 A | 4/1990 | Mullet |
| 4,944,142 A | 7/1990 | Sueshige |
| 5,109,656 A | 5/1992 | Zimmer |
| 5,163,275 A | 11/1992 | Hare |
| 5,259,176 A | 11/1993 | Kahamura |
| 5,407,400 A | 4/1995 | Thomas |
| 5,809,765 A | 9/1998 | Hastings |
| 5,890,354 A | 4/1999 | Bednar |
| 5,894,717 A | 4/1999 | Yamashita |
| 5,960,619 A | 10/1999 | Seidel |
| 6,449,933 B1 | 9/2002 | Umemoto |
| 6,625,966 B2 | 9/2003 | Kaneyuki |
| 7,090,045 B2 | 8/2006 | Okada |
| 7,231,755 B2 | 6/2007 | Clarke |
| 7,347,434 B2 | 3/2008 | Lewis |
| 7,392,643 B2 | 7/2008 | Warashina |
| 7,677,344 B2 | 3/2010 | Medina |
| 7,802,417 B2 | 9/2010 | Sauerwein |
| 8,256,198 B2 | 9/2012 | Thompson |
| 8,708,074 B1 * | 4/2014 | McCoy .................... B60K 6/52 |
| | | 180/65.285 |
| 8,875,833 B2 | 11/2014 | Kouma |
| 9,021,777 B2 | 5/2015 | Johnson |
| 9,038,356 B2 | 5/2015 | Shao |
| D755,858 S | 5/2016 | Brown |
| 9,386,743 B2 | 7/2016 | Baker |
| 9,439,352 B2 | 9/2016 | Arvidsson |
| 9,462,747 B2 | 10/2016 | Schmalz |
| 9,480,200 B1 | 11/2016 | Patridge |
| 9,491,907 B2 | 11/2016 | Edholm |
| 9,677,648 B2 | 6/2017 | Wadzinski |
| 10,070,579 B2 | 9/2018 | Kuriyagawa |
| 10,070,584 B2 | 9/2018 | Kuriyagawa |
| 10,080,327 B2 | 9/2018 | Helgesen |
| 10,091,931 B2 | 10/2018 | Yoshimura |
| 10,123,478 B2 | 11/2018 | Shaffer et al. |
| 10,188,032 B2 | 1/2019 | Ito |
| 10,285,328 B2 | 5/2019 | Kurioka |
| 10,306,831 B2 | 6/2019 | Porter |
| 10,433,478 B2 | 10/2019 | Smith |
| 10,485,167 B2 | 11/2019 | Smith |
| 10,624,262 B2 | 4/2020 | Bejcek |
| 10,834,871 B2 * | 11/2020 | Shaffer ................ A01D 34/824 |
| 10,940,750 B2 | 3/2021 | Pan |
| 11,122,737 B2 | 9/2021 | Xu |
| 11,246,260 B2 | 2/2022 | Xu |
| 2002/0069631 A1 | 6/2002 | Dyke |
| 2002/0189137 A1 | 12/2002 | Cox |
| 2003/0182919 A1 | 10/2003 | Baumann |
| 2011/0036065 A1 | 2/2011 | Wong |
| 2011/0173941 A1 | 7/2011 | Persson |
| 2013/0046448 A1 | 2/2013 | Fan |
| 2016/0201771 A1 | 7/2016 | Wadzinski et al. |
| 2017/0202138 A1 | 7/2017 | Pellenc |
| 2017/0367265 A1 | 12/2017 | Wadzinski et al. |
| 2018/0368316 A1 | 12/2018 | Shaffer et al. |
| 2019/0045707 A1 | 2/2019 | Patridge |
| 2019/0133036 A1 | 5/2019 | Legan |
| 2019/0183041 A1 | 6/2019 | Nonaka |
| 2019/0307063 A1 | 10/2019 | Hong |
| 2020/0100426 A1 | 4/2020 | Kurihara |
| 2020/0164741 A1 | 5/2020 | Tsuji |
| 2020/0215906 A1 | 7/2020 | Shimazaki |
| 2020/0375102 A1 | 12/2020 | Arendt et al. |
| 2021/0112712 A1 | 4/2021 | Vaughn |
| 2022/0124976 A1 | 4/2022 | Xu |

FOREIGN PATENT DOCUMENTS

| | | |
|---|---|---|
| CN | 101836540 A | 9/2010 |
| CN | 202172591 U | 3/2012 |
| CN | 103283375 A | 9/2013 |
| CN | 103283380 A | 9/2013 |
| CN | 203344655 U | 12/2013 |
| CN | 203407205 U | 1/2014 |
| CN | 203407212 U | 1/2014 |
| CN | 103843516 A | 6/2014 |
| CN | 203723096 U | 7/2014 |
| CN | 203851475 U | 10/2014 |
| CN | 203951828 | 11/2014 |
| CN | 203984888 U | 12/2014 |
| CN | 104334008 A | 2/2015 |
| CN | 104686083 B | 6/2015 |
| CN | 204362533 U | 6/2015 |
| CN | 104919967 B | 9/2015 |
| CN | 204976318 U | 1/2016 |
| CN | 205207090 U | 5/2016 |
| CN | 106042916 A | 10/2016 |
| CN | 206260310 U | 6/2017 |
| CN | 206690874 U | 12/2017 |
| CN | 206808087 U | 12/2017 |
| CN | 207235370 U | 4/2018 |
| CN | 207269314 U | 4/2018 |
| CN | 207589549 U | 7/2018 |
| CN | 108450122 A | 8/2018 |
| CN | 108834443 A | 11/2018 |
| CN | 208113339 U | 11/2018 |
| CN | 109392415 A | 3/2019 |
| CN | 109496564 A | 3/2019 |
| CN | 209170911 U | 7/2019 |
| CN | 209299732 U | 8/2019 |
| CN | 110636754 A | 12/2019 |
| CN | 210093998 U | 2/2020 |
| CN | 210491696 U | 5/2020 |
| CN | 111328557 A | 6/2020 |
| CN | 210694954 U | 6/2020 |
| CN | 111492805 A | 8/2020 |
| CN | 212573551 U | 2/2021 |
| CN | 212643450 U | 3/2021 |
| DE | 102018216089 A1 | 3/2020 |
| EP | 0014385 B1 | 8/1980 |
| EP | 481655 B1 | 4/1992 |
| EP | 0510882 A1 | 10/1992 |
| EP | 0937379 B1 | 8/1999 |
| EP | 1752036 B1 | 7/2008 |
| EP | 2170032 B1 | 4/2010 |
| EP | 3334270 B1 | 6/2018 |

(56)    References Cited

FOREIGN PATENT DOCUMENTS

| FR | 2914141 B1 | 10/2008 |
| JP | 2002119114 A | 4/2002 |
| JP | 2014128218 A | 7/2014 |

OTHER PUBLICATIONS

Chinese Office Action Corresponding with Application No. 202210133173.5 on Apr. 14, 2023 (2 pages).
European Search Report Corresponding with Application No. EP22152877 on Sep. 16, 2022 (2 pages).

* cited by examiner

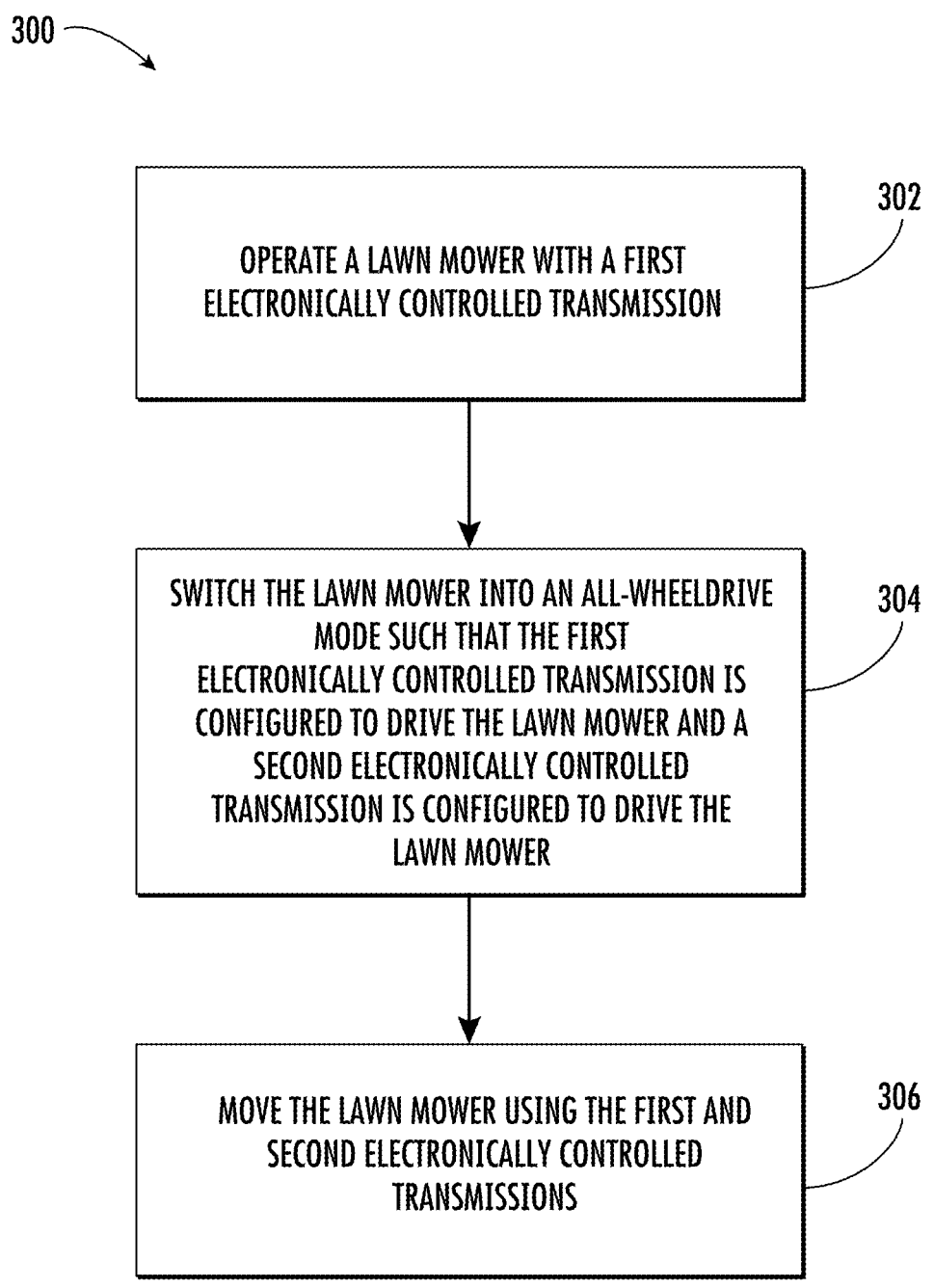

300

302

OPERATE A LAWN MOWER WITH A FIRST ELECTRONICALLY CONTROLLED TRANSMISSION

304

SWITCH THE LAWN MOWER INTO AN ALL-WHEELDRIVE MODE SUCH THAT THE FIRST ELECTRONICALLY CONTROLLED TRANSMISSION IS CONFIGURED TO DRIVE THE LAWN MOWER AND A SECOND ELECTRONICALLY CONTROLLED TRANSMISSION IS CONFIGURED TO DRIVE THE LAWN MOWER

306

MOVE THE LAWN MOWER USING THE FIRST AND SECOND ELECTRONICALLY CONTROLLED TRANSMISSIONS

FIG. 3

LAWN MOWER

FIELD

The present disclosure relates generally to lawn mowers, and more particularly to lawn mowers having selectable drive modes.

BACKGROUND

Lawn mowers are often used as part of routine lawn care routines. Lawn mowers are traditionally powered by internal combustion engines which drive cutting blades at high speeds. As the lawn mower is advanced over the ground, the cutting blades trim the underlying grass to a desired height. In propelled, traditional lawn mowers, pulleys are utilized to transfer energy from the internal combustion engine to a drive wheel. Such pulleys are subject to wear and damage which can cause premature failure of the lawn mower.

Accordingly, improved lawn mowers are desired in the art. In particular, lawn mowers which provide enhanced operational capacity without compromising on functionality would be advantageous.

BRIEF DESCRIPTION

Aspects and advantages of the invention in accordance with the present disclosure will be set forth in part in the following description, or may be obvious from the description, or may be learned through practice of the technology.

In accordance with one embodiment, a lawn mower is provided. The lawn mower includes: a mower deck; a cutting implement disposed below the mower deck; a handle coupled to the mower deck; a battery receiver configured to receive one or more batteries; a rear drive wheel; a forward drive wheel; a rear transmission coupled to the rear drive wheel and configured to receive power from the one or more batteries; a forward transmission coupled to the forward drive wheel and configured to receive power from the one or more batteries; and a controller configured to control at least one of the rear or forward transmissions In accordance with another embodiment, a method of operating a lawn mower is provided. The method includes operating the lawn mower with a first electronically controlled transmission, the first electronically controlled transmission being associated with a shaft coupled with one of a forward drive wheel and a rear drive wheel; switching the lawn mower into an all-wheel-drive mode such that the first electronically controlled transmission is configured to drive the lawn mower and a second electronically controlled transmission is configured to drive the lawn mower, the second electronically controlled transmission being associated with a shaft coupled with the other one of the forward drive wheel and the rear drive wheel; and moving the lawn mower using the first and second electronically controlled transmissions, wherein the first and second electronically controlled transmissions are each configured to receive electrical power from one or more batteries, and wherein rotational speeds of the first and second electronically controlled transmissions are different from one another.

These and other features, aspects and advantages of the present invention will become better understood with reference to the following description and appended claims. The accompanying drawings, which are incorporated in and constitute a part of this specification, illustrate embodiments of the technology and, together with the description, serve to explain the principles of the technology.

BRIEF DESCRIPTION OF THE DRAWINGS

A full and enabling disclosure of the present invention, including the best mode of making and using the present systems and methods, directed to one of ordinary skill in the art, is set forth in the specification, which makes reference to the appended figures, in which:

FIG. 3 is a flow chart of a method of operating a lawn mower in accordance with embodiments of the present disclosure.

DETAILED DESCRIPTION

Figure 1:
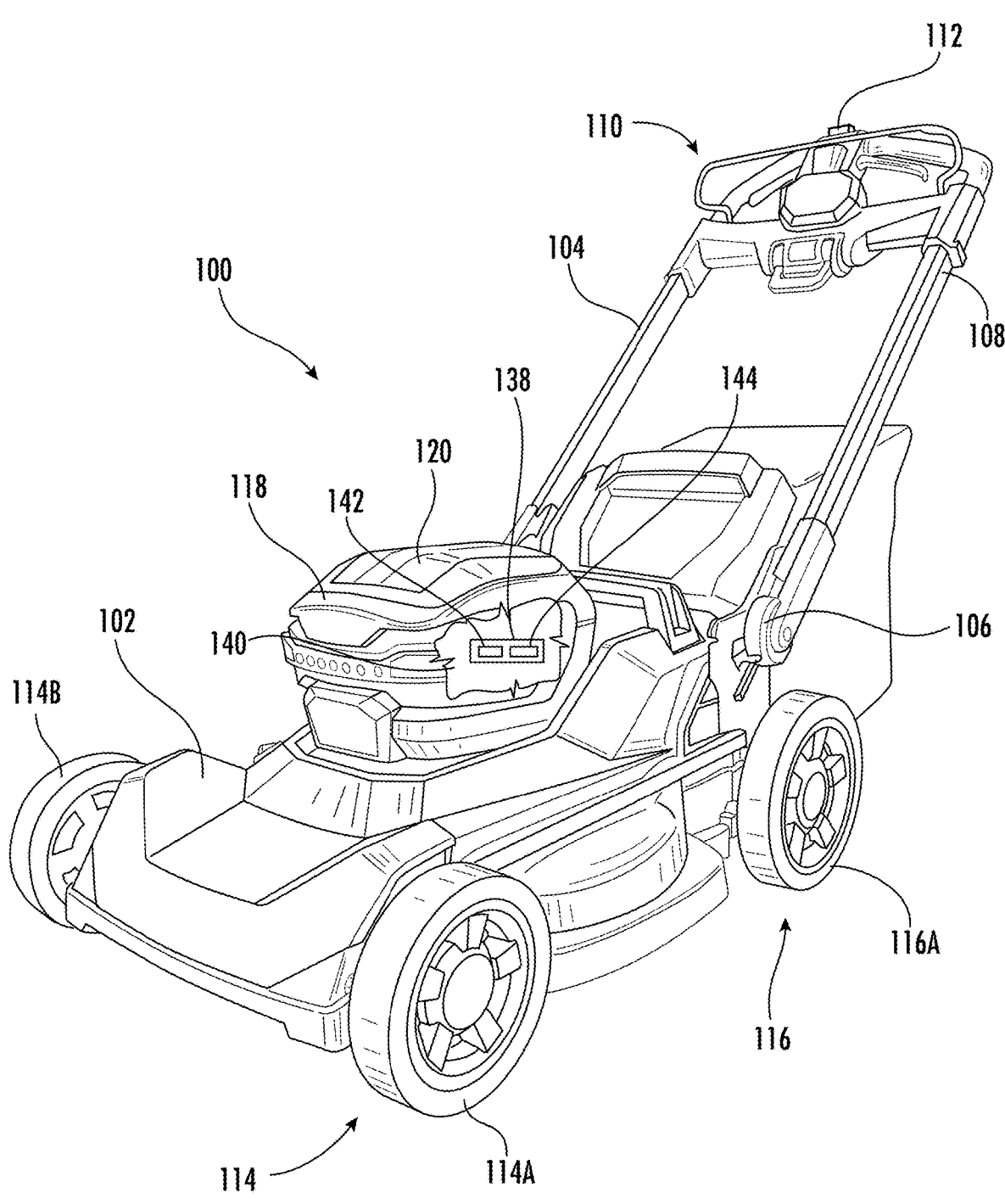
FIG. 1 is a perspective view of a lawn mower in accordance with embodiments of the present disclosure.

Reference now will be made in detail to embodiments of the present invention, one or more examples of which are illustrated in the drawings. The word "exemplary" is used herein to mean "serving as an example, instance, or illustration." Any implementation described herein as "exemplary" is not necessarily to be construed as preferred or advantageous over other implementations. Moreover, each example is provided by way of explanation, rather than limitation of, the technology. In fact, it will be apparent to those skilled in the art that modifications and variations can be made in the present technology without departing from the scope or spirit of the claimed technology. For instance, features illustrated or described as part of one embodiment can be used with another embodiment to yield a still further embodiment. Thus, it is intended that the present disclosure covers such modifications and variations as come within the scope of the appended claims and their equivalents. The detailed description uses numerical and letter designations to refer to features in the drawings. Like or similar designations in the drawings and description have been used to refer to like or similar parts of the invention.

As used herein, the terms "first", "second", and "third" may be used interchangeably to distinguish one component from another and are not intended to signify location or importance of the individual components. The singular forms "a," "an," and "the" include plural references unless the context clearly dictates otherwise. The terms "coupled," "fixed," "attached to," and the like refer to both direct coupling, fixing, or attaching, as well as indirect coupling, fixing, or attaching through one or more intermediate components or features, unless otherwise specified herein. As used herein, the terms "comprises," "comprising," "includes," "including," "has," "having" or any other variation thereof, are intended to cover a non-exclusive inclusion. For example, a process, method, article, or apparatus that comprises a list of features is not necessarily limited only to those features but may include other features not expressly listed or inherent to such process, method, article, or apparatus. Further, unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present).

Terms of approximation, such as "about," "generally," "approximately," or "substantially," include values within ten percent greater or less than the stated value. When used in the context of an angle or direction, such terms include within ten degrees greater or less than the stated angle or direction. For example, "generally vertical" includes directions within ten degrees of vertical in any direction, e.g., clockwise or counter-clockwise.

Benefits, other advantages, and solutions to problems are described below with regard to specific embodiments. However, the benefits, advantages, solutions to problems, and any feature(s) that may cause any benefit, advantage, or solution to occur or become more pronounced are not to be construed as a critical, required, or essential feature of any or all the claims.

In general, power tools described in accordance with one or more embodiments of the present disclosure can include lawn mowers driven by electric motors and having selectable drive modes. The selectable drive modes can include, for example, a single-axle drive mode and an all-wheel-drive mode. The operator can select between the various drive modes using a drive mode selector.

Referring now to the drawings, FIG. 1 illustrates a perspective view of a lawn mower 100 in accordance with an exemplary embodiment of the present disclosure. In accordance with one or more embodiments described herein, the lawn mower 100 may be reconfigurable between a plurality of operating modes, including, e.g., an all-wheel-drive mode and a single-axle drive mode (e.g., two-wheel-drive mode). The lawn mower 100 shown in FIG. 1 is depicted as including a mower deck 102. The mower deck 102 may include a platform defining an upper surface and a lower surface. The mower deck 102 may thus delineate a cutting area from the surrounding environment so as to prevent flying debris from hitting the operator when in use.

The lawn mower 100 can further include a handle 104. The handle 104 can extend in an upward and rearward direction from the mower deck 102 such that the handle 104 permits an operator to push or guide the lawn mower 100 over terrain. When the lawn mower 100 is in self-propel mode, the operator can use the handle 104 to guide the lawn mower 100. When the lawn mower 100 is in unpropelled mode, the operator can use the handle 104 to push the lawn mower 100.

The handle 104 can include a lower pivot assembly 106 which permits adjustment of the handle 104 in relation to the mower deck 102. For instance, the pivot assembly 106 can permit the handle 104 to pivot between a plurality of in-use positions having different angular displacements relative to the mower deck 102. By way of another example, the pivot assembly 106 can permit the handle 104 to pivot to a stored configuration whereby the handle 104 is, e.g., folded forward over the mower deck 102.

An upper end 108 of the handle 104 can include one or more user interfaces 110 that allow the operator to adjust one or more parameters associated with operation of the lawn mower 100. By way of non-limiting example, the user interfaces 110 can include any one or more of a power interface configured to power on the lawn mower 100, a bail configured to prevent movement of the lawn mower 100 until the bail is depressed, a speed controller, an implement (e.g., blade) controller configured to selectively engage or disengage the implement from operation, a clippings release implement configured to selectively release a clippings container from the lawn mower 100, or an auxiliary switch configured to operate an auxiliary component of the lawn mower 100 (e.g., one or more LED lights).

In an embodiment, the user interfaces 110 includes a drive mode selector 112 that is selectable between single-axis drive mode and all-wheel-drive mode.

In an embodiment, the drive mode selector 112 includes a push button. When the push button is depressed, the drive mode selector 112 is in a first operative state, e.g., all-wheel-drive mode. When the push button is not depressed, the drive mode selector 112 is in a second operative state different than the first operative state, e.g., a single-axle drive mode. The push button may be spring biased to return to the non-depressed state. The push button may be selectively retained in the depressed state by a detent or similar mechanism which selectively maintains the push button in the depressed state until the operator depresses the push button.

In another embodiment, the drive mode selector 112 includes a rotatable dial. The rotatable dial may be rotatable between a plurality of positions, including the aforementioned all-wheel-drive mode position and the aforementioned single-axle drive mode position. The rotatable dial may be selectively lockable in one or more of the plurality of positions. In certain instances, rotation of the rotatable dial may be prevented until the operator performs a secondary action other than rotation of the dial. For instance, prior to rotating the rotatable dial, the operator may be required to depress or lift the rotatable dial to unlock rotational movement.

In another embodiment, the drive mode selector 112 can include a switch can be pivotably toggled between a plurality of positions, including the aforementioned all-wheel-drive mode position and the aforementioned single-axle drive mode position. A lock may selectively prevent movement of the switch. Other drive mode selector interfaces are contemplated herein. The aforementioned list of drive mode selectors is meant to be illustrative; the disclosure is not intended to be limited to those drive mode selectors 112 described above.

Referring still to FIG. 1, the lawn mower 100 can further include a forward drive wheel 114 including a first (e.g., left) forward drive wheel 114A and a second (e.g., right) forward drive wheel 114B. In certain instances, the left and right forward drive wheels 114A and 114B may be coupled together such that a common motive force provided to one of the left and right forward drive wheels 114A or 114B is also provided to the other of the left and right forward drive wheels 114A or 114B.

Figure 2:
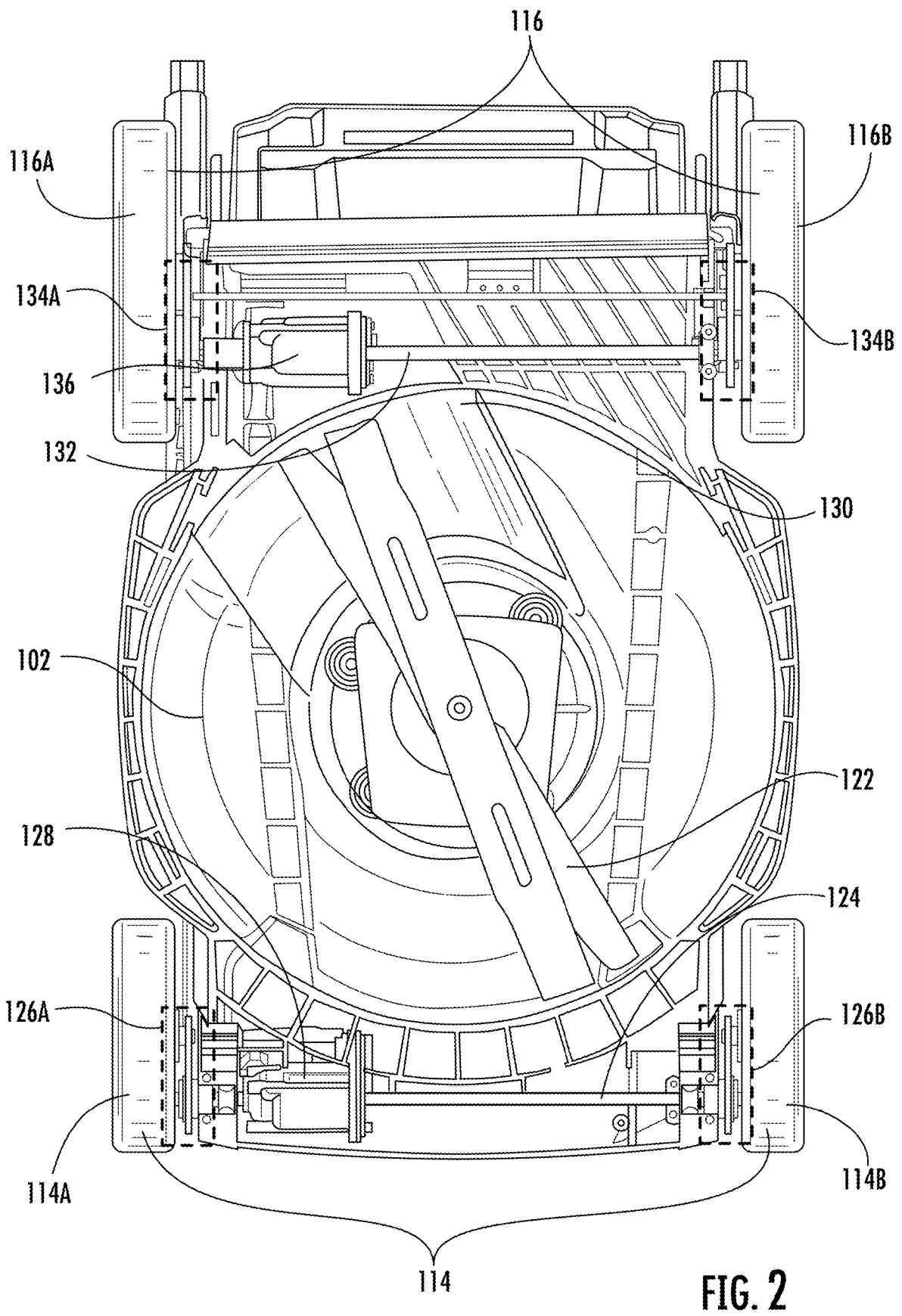
FIG. 2 is a bottom view of the lawn mower in accordance with embodiments of the present disclosure.

The lawn mower 100 can further include a rear drive wheel 116 including a first (e.g., left) rear drive wheel 116A and a second (e.g., right) rear drive wheel 116B (FIG. 2). In certain instances, the left and right rear drive wheels 116A and 116B may be coupled together such that a common motive force provided to one of the left and right rear drive wheels 116A or 116B is also provided to the other of the left and right rear drive wheels 116A or 116B.

As described in greater detail below, the forward or rear drive wheels 114 and 116 can be powered by electric motors. The electric motors can be powered by one or more batteries. By way of non-limiting example, at least one of the one or more batteries can include lithium-ion batteries. In certain instances, the one or more batteries may share a common shape, size, power rating, or the like. In other instances, at least one of the one or more batteries may have a unique shape, size, or power rating as compared to the other(s) of the one or more batteries.

The one or more batteries can be receivable in a battery receiver 118 of the lawn mower 100. The battery receiver 118 may be coupled with the mower deck 102, for example, adjacent to an upper surface of the mower deck 102. The battery receiver 118 can include one or more electrical interfaces, e.g., electrical contacts, configured to electrically couple with one or more electrical interfaces of the one or more batteries. The one or more batteries may be readily detachable from the electrical contacts of the lawn mower 100. In one or more embodiments, the battery receiver 118 may define an interior compartment with a selectively closable cover 120 configured to selectively cover the interior compartment to prevent debris from contacting the one or more batteries. The cover 120 may be pivotally connected to the lawn mower 100 such that the operator can pivot the cover 120 between an open position, whereby the one or more batteries can be accessed, and a closed position, whereby the one or more batteries are protected. Alternatively, the cover 120 may include any one or more of a snap on cover, a sliding cover, or the like.

FIG. 2 illustrates a bottom view of the lawn mower 100 as seen in accordance with an exemplary embodiment of the present disclosure. As depicted, the forward and rear drive wheels 114 and 116 are disposed at forward and rear ends of the mower deck 102, respectively, spaced apart from one another in a lateral direction by the mower deck 102. A cutting implement 122 is disposed below the mower deck 102. The cutting implement 122 includes a rotatable blade having one or more sharpened edges configured to cut through underlying material. Alternatively, the cutting implement 122 can include another type of cutting device, such as a cutting string, wire, or the like. The cutting implement 122 can be operatively coupled with a motor (not illustrated) that can rotatably drive the cutting implement 122. The shape and size of the mower deck 102 may be selected to receive the rotating cutting implement 122 and prevent egress of debris from the cutting area.

Referring initially to the forward drive wheels 114, a shaft 124 can extend between the left and right forward drive wheels 114A and 114B. The shaft 124 may be coupled to the left forward drive wheel 114A through a first drive gear and the shaft 124 may be coupled to the right forward drive wheel 114B through a second drive gear. By way of example, the left forward drive wheel 114A may be rotatable about a rotational axis. The first drive gear may be configured to provide motive force from the shaft 124 at a location radially spaced apart from the rotational axis. For instance, the left forward drive wheel 114A may include a gear interface along a peripheral location of the wheel. The first drive gear may mesh with the gear interface so as to drive the left forward drive wheel 114A. The right forward drive wheel 114B may be meshed with a second drive gear through a similar, or same, interface.

In the depicted embodiment, the left and right forward drive wheels 114A and 114B are each coupled to the shaft 124 through respective overrunning clutches 126A and 126B. The overrunning clutches 126A and 126B can permit the lawn mower 100 to turn when the shaft 124 is driving the forward drive wheels 114. That is, the overrunning clutches 126A and 126B may selectively permit the forward drive wheels 114A or 114B, respectively, to slip relative to the shaft 124 such that the operator can turn the lawn mower 100 without binding the forward drive wheels 114 or cause damage to the lawn mower 100.

The shaft 124 can be in operative communication with a forward transmission 128. The forward transmission 128 can include an electronic transmission. The forward transmission 128 can be configured to provide motive force to the shaft 124 so as to rotate the shaft 124. In certain instances, the shaft 124 can extend through the forward transmission 128. The shaft 124 can be keyed with the forward transmission 128 to transfer rotational force into the shaft 124. Rotational force transferred to the shaft 124 can rotate at least one of the forward drive wheels 114A and 114B through the respective overrunning clutch 126A or 126B to propel the lawn mower 100.

In certain instances, the forward transmission 128 can be a dual-directional transmission configured to drive the shaft 124 in clockwise or counterclockwise rotation. That is, the forward transmission 128 can propel the lawn mower 100 in both the forward or rear directions. Affecting the direction of propulsion may be performed by the operator at the user interface 110. In other instances, the forward transmission 128 may be a uni-directional transmission configured to drive the shaft 124 in only a single rotational direction. For example, the forward transmission 128 can be configured to propel the lawn mower 100 in only a forward direction. To reverse the lawn mower 100, the operator can pull on the handle 104.

The lawn mower 100 defines a centerline 130 extending from the front end of the lawn mower 100 to the rear end of the lawn mower 100. In an embodiment, the forward transmission 128 is offset from the centerline 130, e.g., laterally offset from the centerline 130, by a distance. That is, the forward transmission 128 can be disposed closer to the first forward drive wheel 114A than the second forward drive wheel 114B. In a particular instance, the entire forward transmission 128 can be disposed on one side of the centerline 130.

A shaft 132 can extend between the left and right rear drive wheels 116A and 116B. The shaft 132 may be coupled to the left rear drive wheel 116A through a first drive gear and the shaft 132 may be coupled to the right rear drive wheel 116B through a second drive gear. By way of example, the left rear drive wheel 116A may be rotatable about a rotational axis. The first drive gear may be configured to provide motive force from the shaft 132 at a location radially spaced apart from the rotational axis. For instance, the left rear drive wheel 116A may include a gear interface along a peripheral location of the wheel. The first drive gear may mesh with the gear interface so as to drive the left rear drive wheel 116A. The right rear drive wheel 116B may be meshed with a second drive gear through a similar, or same, interface.

In the depicted embodiment, the left and right rear drive wheels 116A and 116B are each coupled to the drive shaft 132 through respective overrunning clutches 134A and 134B. The overrunning clutches 134A and 134B can permit the lawn mower 100 to turn when the shaft 132 is driving the rear drive wheels 116. That is, the overrunning clutches 134A and 134B may selectively permit the rear drive wheels 116A or 116B, respectively, to slip relative to the shaft 132 such that the operator can turn the lawn mower 100 without binding the rear drive wheels 116 or cause damage to the lawn mower 100.

The shaft 132 can be in operative communication with a rear transmission 136. The rear transmission 136 can include an electronic transmission. The rear transmission 136 can be configured to provide motive force to the shaft 132 so as to rotate the shaft 132. In certain instances, the shaft 132 can extend through the rear transmission 136. Rotational movement transferred to the shaft 132 can rotate at least one of the rear drive wheels 116A and 116B through the respective overrunning clutches 134A and 134B to propel the lawn mower 100.

Similar to the aforementioned forward transmission 128, in certain instances, the rear transmission 136 can be a dual-directional transmission configured to drive the shaft 132 in clockwise or counterclockwise rotation. That is, the rear transmission 136 can propel the lawn mower 100 in both the forward or rear directions. Affecting the direction of propulsion may be performed by the operator at the user interface 110. In other instances, the rear transmission 136 may be a uni-directional transmission configured to drive the shaft 132 in only a single rotational direction. For example, the rear transmission 136 can be configured to propel the lawn mower 100 in only a forward direction. To reverse the lawn mower 100, the operator can pull on the handle 104.

In an embodiment, the rear transmission 136 is offset from the centerline 130, e.g., laterally offset from the centerline 130, by a distance. That is, the rear transmission 136 can be disposed closer to the first forward drive wheel 114A than the second forward drive wheel 114B. In a particular instance, the entire rear transmission 136 can be disposed on one side of the centerline 130.

The forward or rear transmissions 128 and 136 can share any number of same or similar qualities, characteristics or functionalities as compared to one another. For instance, the forward or rear transmissions 128 and 136 can include a same or similar transmission design, same or similar gear ratio, same or similar relative displacements from the centerline, same or similar operational power ratings, or the like. In an embodiment, the forward or rear transmissions 128 and 136 can define one or more different qualities, characteristics or functionalities as compared to one another. For instance, the forward or rear transmissions 128 and 136 can have different gear ratios, different operational power ratings, or the like.

The forward or rear transmissions 128 and 136 can be in electrical communication with the aforementioned one or more batteries connected to the lawn mower 100. The one or more batteries may thus selectively supply power to the forward or rear transmissions 128 or 136 when the operator engages the self-propel lawn mower 100 and initiates at least one of the forward or rear transmissions 128 or 136. In some embodiments, in single-axle drive mode, the lawn mower 100 may be propelled by only the forward transmission 128. In other embodiments, in single-axle drive mode, the lawn mower 100 may be propelled only by the rear transmission 136. In some instances, the lawn mower 100 may be selectable between two different single-axle drive modes, i.e., using either of the forward transmission 128 or the rear transmission 136. Selection between the different single-axle drive modes (e.g., forward drive or rear drive) may be performed using a selector input mechanism located, e.g., at the user interface 110. In other instances, the lawn mower 100 may only be propelled in single-axle drive mode by a particular one of the forward transmission or the rear transmission 136. That is, single-axle drive mode may be limited to, e.g., rear wheel drive. When the drive mode selector 112 is in the all-wheel-drive mode, both the forward or rear transmissions 128 and 136 can be used simultaneously to propel the lawn mower 100.

In all-wheel-drive mode, the lawn mower 100 may exhibit increased traction, control, torque, or any combination thereof. However, operational range of the lawn mower 100 may be reduced in all-wheel drive mode. In all-wheel-drive mode, power distributed to the forward or rear drive wheels 114 and 116 may be equal, or approximately equal. In another embodiment, greater power can be distributed to either one of the forward or rear drive wheels 114 or 116 in the all-wheel-drive mode. For instance, the rear drive wheels 116 may provide at least 51% of the propulsion, such as at least 60% of the propulsion, such as at least 70% of the propulsion, such as at least 80% of the propulsion, such as at least 90% of the propulsion. Meanwhile, the front drive wheels 114 can provide the remaining propulsion.

In single-axle drive mode, the lawn mower 100 may exhibit increased operational range. However, traction, control, torque, or any combination thereof may be reduced in single-axle drive mode. In some instances, the lawn mower 100 may automatically revert to single-axle mode when a power level of the one or more batteries drops below a critical threshold (e.g., less than 20% charge remaining, such as less than 10% charge remaining, such as less than 5% charge remaining).

Referring again to FIG. 1, the lawn mower 100 may include a controller 138. The controller 138 illustrated in FIG. 1 is depicted in an interior volume 140 of the lawn mower 100. Locating the controller 138 within the interior volume 140 may protect the controller 138 against, e.g., flying debris. In other embodiments, the controller 138 can be disposed in the handle 104 or at another location along the lawn mower 100. The controller 138 can be in communication with any one or more of the forward transmission 128, the rear transmission 136, the one or more batteries, a sensor disposed on the lawn mower 100, or the user interface 110 (e.g., the drive mode selector 112). The controller 138 can include, e.g., a memory unit 142 configured to store computer readable information and a processor 144 configured to execute the computer readable information.

In an embodiment, the controller 138 can control at least one of the forward or rear transmissions 128 or 136 in response to inputs generated at the user interface 110. For example, the controller 138 may receive a signal indicating engagement of the drive mode selector 112 between a first position corresponding with single-axle drive mode and a second position corresponding with all-wheel-drive mode. In response to the signal, the controller 138 can switch from single-axle drive mode to all-wheel drive mode.

With the lawn mower 100 in the all-wheel-drive mode, the controller 138 may control both the forward or rear transmissions 128 and 136 to propel the lawn mower 100. With the lawn mower 100 in single-axle drive mode, the controller 138 may control only one of the forward or rear transmissions 128 or 136 to propel the lawn mower 100. It should be understood that even in single-axle drive mode, the controller 138 may remain in communication with, or even control of, the other transmission (i.e., the non-driven transmission), however, propulsion forces may be generated by only one of the forward or rear transmissions 128 or 136.

The controller 138 may be configured to control the relative speeds of the forward or rear drive wheels 114 and 116 to provide smooth all-wheel-drive propulsion to the lawn mower 100.

In an embodiment, the forward drive wheels 114 define a first diameter and the rear drive wheels 116 define a second diameter different than the first diameter. For instance, the first diameter may be less than the second diameter. In an embodiment, a ratio of the first diameter to the second diameter is in a range of 1:2 and 9:10. In a particular embodiment, the ratio of the first diameter to the second diameter is approximately 8:11. By way of non-limiting example, the first diameter may be in a range of 6 inches and 10 inches, such as 8 inches, and the second diameter may be in a range of 10 inches and 12 inches, such as 11 inches.

To propel the lawn mower 100 in all-wheel-drive mode, the controller 138 can instruct the forward or rear transmissions 128 and 136 to operate at different relative speeds. That is, for example, the forward transmission 128 can rotate the shaft 124 at a faster rate (e.g., greater revolutions per minute (RPM)) than the rear transmission 136 so as to cause the effective displacement at the forward or rear drive wheels 114 and 116 to be equal to one another. In one or more embodiments, the controller 138 can instruct the forward or rear transmissions 128 and 136 to operate at different relative speeds from one another over the entire range of propulsion speeds of the lawn mower 100 so as to cause the displacement of the forward or rear drive wheels 114 and 116 to be equal at all times.

In another embodiment, the relative speeds of the forward and rear drive wheels 114 and 116 can be controlled by a component other than the controller 138, such as by using different relative gearing ratios, or the like.

In certain instances, the controller 138 may include a plurality of control maps each defining a different operating characteristic of the lawn mower 100. For instance, the plurality of control maps may include first and second control maps each configured to change an aspect of the propulsion experience of the lawn mower 100—such as throttle response, maximum speed, acceleration curves, bail overrides, or the like. In certain instances, the control map utilized in all-wheel-drive mode is different than the control map utilized in single-axle drive mode. For instance, by way of non-limiting example, in all-wheel-drive mode the controller 138 may utilize a control map having a quicker acceleration curve or a higher maximum speed in response to enhanced traction created by driving all wheels of the lawn mower 100. Similarly, in single-axle mode, the controller 138 may utilize a control map having a slower throttle response, e.g., an economical (eco) mode, to conserve battery power. In embodiments where the lawn mower 100 can be operated in single-axle mode by driving either the forward drive wheels 114 or the rear drive wheels 116, the controller 138 may be reconfigurable between different control maps depending on which axle is being propelled. For instance, when the forward drive wheels 114 are driven in single-axle mode, the controller 138 may utilize a control map having a slower throttle response to mitigate wheel slip which might occur more easily than when propelling the lawn mower 100 using the rear drive wheels 116.

In one or more embodiments, the controller 138 can utilize logic controls, e.g., feedback loops, to adjust rotational speeds of the forward or rear transmissions 128 and 136, e.g., on the fly, to maintain a desired characteristic such as equal displacement of the forward or rear transmissions 128 and 136 in the event of installation of differently sized wheels, wheel wear, damage to the wheels, detected slip conditions at the wheels, or the like.

Advantageously, the lawn mower 100 can include features which allow the operator to quickly and effectively change the lawn mower 100 between a plurality of operating conditions without requiring the operator to manually adjust any pulleys, gears, or the like. Moreover, in certain instances the lawn mower 100 may be reconfigurable between single-axle drive mode and all-wheel-drive mode without requiring the lawn mower 100 be stopped. In this regard, the operator can adjust the lawn mower 100 on the fly, allowing the operator to adjust traction as needed based, e.g., on the varying terrain being traversed.

FIG. 3 illustrates an exemplary flow chart of a method 300 of operating a lawn mower. The method 300 includes a step 302 of operating the lawn mower with a first electronically controlled transmission. The first electronically controlled transmission is associated with a shaft coupled with one of a front drive wheel and a rear drive wheel. At step 302, the lawn mower is operating in single-axle mode. Single-axle mode may enhance battery range, allowing the lawn mower to operate to utilize the lawn mower over a larger cutting area.

The method 300 further includes a step 304 of switching the lawn mower into an all-wheel-drive mode such that the first electronically controlled transmission is configured to drive the lawn mower and a second electronically controlled transmission is also configured to drive the lawn mower. The second electronically controlled transmission can be associated with a shaft coupled with the other one of the front drive wheel and the rear drive wheel. In certain instances, step 304 is performed with the lawn mower resting, i.e., stopped. In other instances, step 304 may be performed while the lawn mower is moving.

After step 304, the lawn mower may be ready for all-wheel-drive mode. The method 300 can further include a step 306 of moving the lawn mower using the first and second electronically controlled transmissions. The first and second electronically controlled transmissions can each include motors that are configured to receive electrical power. Upon receiving electrical power, the first and second electronically controlled transmissions can propel the lawn mower. It is noted that the driven rotational speeds of the first and second electronically controlled transmissions can be different from one another. Such difference may be the result of, e.g., different wheel sizes of the forward or rear drive wheels. In certain instances, a controller can detect the rotational speeds or one or more other attributes of the lawn mower during step 306 and adjust the speed of either or both of the first or second electronically controlled transmission (s) accordingly.

In an embodiment, the steps 304 and 302 may be repeated in reverse order after step 306 to return the lawn mower to single-axle drive mode. In certain instances, the step of returning the lawn mower to single-axle drive mode can further include selecting which axle is to be powered in single-axle drive mode, i.e., whether the forward or rear drive wheels are to be powered.

Further aspects of the invention are provided by one or more of the following embodiments:

Embodiment 1. A lawn mower comprising: a mower deck; a cutting implement disposed below the mower deck; a handle coupled to the mower deck; a battery receiver configured to receive one or more batteries; a rear drive wheel; a forward drive wheel; a rear transmission coupled to the rear drive wheel and configured to receive power from the one or more batteries; a forward transmission coupled to the forward drive wheel and configured to receive power from the one or more batteries; and a controller configured to control at least one of the rear or forward transmissions.

Embodiment 2. The lawn mower of any one or more of the embodiments, wherein the forward drive wheel has a first diameter, wherein the rear drive wheel has a second diameter different than the first diameter, and wherein the forward and rear drive wheels are driven by the forward and rear transmissions at equal speeds when the lawn mower is in an all-wheel-drive mode.

Embodiment 3. The lawn mower of any one or more of the embodiments, wherein one of the forward or rear drive wheels always propels the lawn mower when the lawn mower is in a propelled state, and wherein the other of the forward or rear drive wheels is configured to selectively propel the lawn mower when the lawn mower is in the propelled state.

Embodiment 4. The lawn mower of any one or more of the embodiments, wherein the handle is configured to extend upward and rearward from the mower deck, and wherein the handle is configured to be pushed by an operator to propel the lawn mower when the lawn mower is in an unpropelled state.

Embodiment 5. The lawn mower of any one or more of the embodiments, wherein the forward drive wheel comprises a first forward drive wheel disposed on a first lateral side of the lawn mower and a second forward drive wheel disposed on a second lateral side of the lawn mower, wherein the forward transmission is coupled to a shaft extending between the first and second forward drive wheels, wherein the shaft is coupled with a first drive gear configured to drive the first forward drive wheel and a second drive gear configured to drive the second forward drive wheel.

Embodiment 6. The lawn mower of any one or more of the embodiments, wherein the first forward drive wheel is rotatable about a rotational axis, and wherein the first drive gear is configured to provide a motive force to the first forward drive wheel at a location radially spaced apart from the rotational axis.

Embodiment 7. The lawn mower of any one or more of the embodiments, wherein the first drive gear is coupled to the first forward drive wheel through an overrunning clutch.

Embodiment 8. The lawn mower of any one or more of the embodiments, wherein the rear drive wheel comprises a first rear drive wheel disposed on the first lateral side of the lawn mower and a second rear drive wheel disposed on the second lateral side of the lawn mower, wherein the rear transmission is coupled to a shaft extending between the first and second rear drive wheels, wherein the shaft is coupled to a first drive gear configured to drive the first rear drive wheel and a second drive gear configured to drive the second rear drive wheel.

Embodiment 9. The lawn mower of any one or more of the embodiments, wherein the first drive gear is coupled to the first rear drive wheel through an overrunning clutch.

Embodiment 10. The lawn mower of any one or more of the embodiments, wherein the forward or rear transmissions each comprise an electric motor, and wherein the cutting implement is rotatably driven by a cutting implement electric motor.

Embodiment 11. The lawn mower of any one or more of the embodiments, wherein the lawn mower defines a centerline extending from a front end of the lawn mower to a rear end of the lawn mower, and wherein the forward or rear transmissions are both laterally offset from the centerline by a same distance.

Embodiment 12. The lawn mower of any one or more of the embodiments, wherein the lawn mower is a push mower.

Embodiment 13. The lawn mower of any one or more of the embodiments, wherein the one or more batteries are removably couplable to the battery receiver.

Embodiment 14. The lawn mower of any one or more of the embodiments, wherein the handle comprises a user interface, and wherein the user interface is selectable between a single-axle drive mode and an all-wheel-drive mode.

Embodiment 15. A method of operating a lawn mower, the method comprising: operating the lawn mower with a first electronically controlled transmission, the first electronically controlled transmission being associated with a shaft coupled with one of a forward drive wheel and a rear drive wheel; switching the lawn mower into an all-wheel-drive mode such that the first electronically controlled transmission is configured to drive the lawn mower and a second electronically controlled transmission is configured to drive the lawn mower, the second electronically controlled transmission being associated with a shaft coupled with the other one of the forward drive wheel and the rear drive wheel; and moving the lawn mower using the first and second electronically controlled transmissions, wherein the first and second electronically controlled transmissions are each configured to receive electrical power from one or more batteries, and wherein rotational speeds of the first and second electronically controlled transmissions are different from one another.

Embodiment 16. The method of any one or more of the embodiments, wherein switching the lawn mower into all-wheel-drive mode is performed at a handle of the lawn mower, and wherein switching the lawn mower into all-wheel-drive mode causes an electronic controller in communication with the second electronically controlled transmission to engage the second electronically controlled transmission.

Embodiment 17. The method of any one or more of the embodiments, wherein the first and second electronically controlled transmissions are configured to drive the front and rear drive wheels at different rotational speeds when the lawn mower is in the all-wheel-drive mode.

Embodiment 18. The method of any one or more of the embodiments, wherein moving the lawn mower comprises rotating the front and rear drive wheels at relatively different rotational speeds.

Embodiment 19. The method of any one or more of the embodiments, wherein the first electronically controlled transmission is coupled with one of a front drive wheel and a rear drive wheel through an overrunning clutch.

Embodiment 20. The method of any one or more of the embodiments, wherein the second electronically controlled transmission is coupled with the other of the front drive wheel and the rear drive wheel through an overrunning clutch.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

What is claimed is:

1. A lawn mower comprising:
a mower deck;
a cutting implement disposed below the mower deck;
a handle coupled to the mower deck;
a battery receiver configured to receive one or more batteries;
a rear drive wheel;
a forward drive wheel;
a rear transmission coupled to the rear drive wheel and configured to receive power from the one or more batteries;
a forward transmission coupled to the forward drive wheel and configured to receive power from the one or more batteries; and
a controller configured to control the rear and forward transmissions,
wherein one of the forward or rear transmissions always propels the lawn mower when the lawn mower is in a single-axle drive mode, and wherein the controller selectively activates the other of the forward or rear transmissions to also propel the lawn mower when the lawn mower is in an all-wheel-drive mode.

2. The lawn mower of claim 1, wherein the forward drive wheel has a first diameter, wherein the rear drive wheel has a second diameter different than the first diameter, and wherein the forward and rear drive wheels are driven by the forward and rear transmissions at equal speeds when the lawn mower is in the all-wheel-drive mode.

3. The lawn mower of claim 1, wherein the handle is configured to extend upward and rearward from the mower deck, and wherein the handle is configured to be pushed by an operator to propel the lawn mower when the lawn mower is in an unpropelled state.

4. The lawn mower of claim 1, wherein the forward drive wheel comprises a first forward drive wheel disposed on a first lateral side of the lawn mower and a second forward drive wheel disposed on a second lateral side of the lawn mower, wherein the forward transmission is coupled to a shaft extending between the first and second forward drive wheels, wherein the shaft is coupled with a first drive gear configured to drive the first forward drive wheel and a second drive gear configured to drive the second forward drive wheel.

5. The lawn mower of claim 4, wherein the first forward drive wheel is rotatable about a rotational axis, and wherein the first drive gear is configured to provide a motive force to the first forward drive wheel at a location radially spaced apart from the rotational axis.

6. The lawn mower of claim 4, wherein the first drive gear is coupled to the first forward drive wheel through an overrunning clutch.

7. The lawn mower of claim 4, wherein the rear drive wheel comprises a first rear drive wheel disposed on the first lateral side of the lawn mower and a second rear drive wheel disposed on the second lateral side of the lawn mower, wherein the rear transmission is coupled to a shaft extending between the first and second rear drive wheels, wherein the shaft is coupled to a first drive gear configured to drive the first rear drive wheel and a second drive gear configured to drive the second rear drive wheel.

8. The lawn mower of claim 7, wherein the first drive gear is coupled to the first rear drive wheel through an overrunning clutch.

9. The lawn mower of claim 1, wherein the forward or rear transmissions each comprise an electric motor, and wherein the cutting implement is rotatably driven by a cutting implement electric motor.

10. The lawn mower of claim 1, wherein the lawn mower defines a centerline extending from a front end of the lawn mower to a rear end of the lawn mower, and wherein the forward or rear transmissions are both laterally offset from the centerline by a same distance.

11. The lawn mower of claim 1, wherein the lawn mower is a push mower.

12. The lawn mower of claim 1, wherein the one or more batteries are removably couplable to the battery receiver.

13. The lawn mower of claim 1, wherein the handle comprises a user interface, and wherein the user interface is selectable between a single-axle drive mode and the all-wheel-drive mode by use of a drive mode selector.

14. A method of operating a lawn mower, the method comprising:

operating the lawn mower in a single-axle drive mode whereby a controller of the lawn mower activates only a first electronically controlled transmission, the first electronically controlled transmission being associated with a shaft coupled with one of a forward drive wheel and a rear drive wheel;

in response to switching the lawn mower into an all-wheel-drive mode, activating, by the controller, the first electronically controlled transmission and a second electronically controlled transmission to drive the lawn mower, the second electronically controlled transmission being associated with a shaft coupled with the other one of the forward drive wheel and the rear drive wheel; and moving the lawn mower using the first and second electronically controlled transmissions, wherein the first and second electronically controlled transmissions are each configured to receive electrical power from one or more batteries, and wherein rotational speeds of the first and second electronically controlled transmissions are different from one another.

15. The method of claim 14, wherein switching the lawn mower into all-wheel-drive mode is performed at a handle of the lawn mower by use of a drive mode selector.

16. The method of claim 14, wherein the first and second electronically controlled transmissions are configured to drive the forward drive wheel and the rear drive wheel at different rotational speeds when the lawn mower is in the all-wheel-drive mode.

17. The method of claim 16, wherein moving the lawn mower comprises rotating the forward drive wheel and the rear drive wheel at relatively different rotational speeds.

18. The method of claim 14, wherein the first electronically controlled transmission is coupled with one of a forward drive wheel and a rear drive wheel through an overrunning clutch.

19. The method of claim 18, wherein the second electronically controlled transmission is coupled with the other of the forward drive wheel and the rear drive wheel through an overrunning clutch.

* * * * *